United States Patent [19]

Levin et al.

[11] Patent Number: 4,646,207

[45] Date of Patent: Feb. 24, 1987

[54] MOTOR VEHICLE LIGHTING SYSTEM INCLUDING A SEALED LENS MEMBER AS PART THEREOF

[75] Inventors: Robert E. Levin, Hamilton; George J. English, Reading, both of Mass.

[73] Assignee: GTE Products Corporation, Stamford, Conn.

[21] Appl. No.: 598,614

[22] Filed: Apr. 10, 1984

[51] Int. Cl.$^4$ ............................................. B60Q 1/04
[52] U.S. Cl. ...................................... 362/80; 362/237; 362/246; 362/292; 362/307; 362/310; 362/331; 362/336; 362/361
[58] Field of Search ............. 362/61, 80, 82, 235–238, 362/240, 242, 246, 257, 268, 290, 291, 292, 296, 307, 310, 317, 311, 330, 331, 335, 336, 339, 340, 351, 355, 354, 361

[56] References Cited

U.S. PATENT DOCUMENTS

| | | | |
|---|---|---|---|
| 1,681,909 | 8/1928 | Russell | 362/235 |
| 2,438,196 | 3/1948 | Washington | 362/310 |
| 4,153,928 | 5/1979 | Speedy | 362/331 |
| 4,198,674 | 4/1980 | Ilhage et al. | 362/238 |
| 4,249,232 | 2/1981 | Dick | 362/61 |
| 4,251,103 | 2/1981 | Nakajima et al. | 362/61 |
| 4,368,505 | 1/1983 | Tomforde | 362/80 |
| 4,446,511 | 5/1984 | Sands | 362/310 |
| 4,459,644 | 7/1984 | Bailly | 362/80 |
| 4,532,578 | 7/1985 | Gaden et al. | 362/80 |

FOREIGN PATENT DOCUMENTS

| | | | |
|---|---|---|---|
| 207743 | 5/1957 | Australia | 362/331 |
| 2312579 | 9/1973 | Fed. Rep. of Germany | 362/374 |
| 2507741 | 12/1982 | France | 362/61 |
| 2509429 | 1/1983 | France | 362/61 |
| 2525322 | 10/1983 | France | 362/61 |
| 2066444 | 7/1981 | United Kingdom | 362/61 |

*Primary Examiner*—Craig R. Feinberg
*Attorney, Agent, or Firm*—Lawrence R. Fraley

[57] ABSTRACT

A lighting system for a motor vehicle adapted to be mounted in a recess within a front, contoured surface of the motor vehicle and including a light source and reflector means, and a lens assembly. The lens assembly comprises a hollow, enclosed, single piece lens member having a front, clear surface positioned to coincide with the vehicle's front, contoured surface so as to enhance aerodynamic performance of the lighting (and vehicle) system, a rear lensing portion positioned substantially vertically, and side and bottom walls for enclosing the lens member to provide a sealed, dirt-free component.

13 Claims, 4 Drawing Figures

MOTOR VEHICLE LIGHTING SYSTEM INCLUDING A SEALED LENS MEMBER AS PART THEREOF

CROSS REFERENCE TO COPENDING APPLICATIONS

In Ser. No. 598,604, now U.S. Pat. No. 4,545,001, entitled "Sealed Lens Member For Use In A Motor Vehicle Lighting System" (Inventors: G. J. English et al), there is defined a hollow, single piece lens member for use in a motor vehicle lighting system containing a plurality of individual lighting modules.

In Ser. No. 598,613, now U.S. Pat. No. 4,569,002, entitled "Motor Vehicle Lighting System" (Inventors: G. J. English et al), there is defined a motor vehicle lighting system wherein a plurality of modules are used in combination with a common lens member designed to control the light from the modules.

In Ser. No. 598,605, entitled "Lamp-Reflector Module For Use In A Motor Vehicle Headlighting System" (Inventors: G. J. English et al), there is claimed the ornamental design for a lamp-reflector module for use in a motor vehicle lighting system.

In Ser. No. 598,606, entitled "Lens Member For A Motor Vehicle Headlighting System" (Inventors: G. J. English et al), there is claimed the ornamental design for a motor vehicle headlight lens member having a plurality of stepped lensing surfaces thereon and a slightly curved forward surface.

In Ser. No. 598,607, entitled "Lens Component For A Motor Vehicle Headlighting System" (Inventors: R. E. Levin et al), there is claimed the ornamental design for a motor vehicle headlight lens having a sloped, clear front surface, a pair of side walls, a bottom wall, and a stepped, rear lensing portion to in turn define a sealed, single piece component.

In Ser. No. 598,615, entitled "Lighting Module For Motor Vehicle Lighting System" (Inventors: G. J. English et al), there is defined a lighting module for use as a part of a vehicle headlighting system wherein the module includes a reflector, a small tungsten halogen capsule sealed within the reflector, and a clear, front cover providing a seal for the module.

All of the above-identified applications were filed Apr. 10, 1984 and are assigned to the same assignee as the instant invention.

DESCRIPTION

Technical Field

The present invention relates in general to a new and improved lighting system for motor vehicles and particularly a lighting system for providing forward illumination for an automobile. More particularly, the present invention relates to an improved lens member for use in such a lighting system. Even more particularly, the present invention is concerned with a motor vehicle lens member constructed so as to provide for improved aerodynamic performance of the motor vehicle. In this regard, it is a ppurpose of the invention to provide a motor vehicle lighting system in which the front outer surface of the lens member thereof is contoured to the automobile body shape, either curved or at a compound angle to the longitudinal automobile center line, while maintaining the optical control lens member in the optimal position (which is preferably normal, or nearly normal, to the automobile's center line).

Background

Existing forward lighting systems used in motor vehicles, and in particular in automobiles, have generally not been designed with aerodynamic considerations in mind. As such, these systems have exhibited poor aerodynamic performance, which can be attributed to at least two factors. First, the vertical dimension (height) of the system's headlamp is relatively large (at least four inches, and in some versions, up to about seven inches). Second, the external surface of these headlamps have not been made in a cooperating shape with the frontal automobile surface. As is known, most headlamps occupy a position such that their lens member is vertical to the ground. With regard to the size (total frontal area, in square inches) of the lighting system, reference is made to U.S. Pat. No. 4,569,002, filed Apr. 10, 1984 and entitled "Motor Vehicle Lighting System", which patent is directed to an improved motor vehicle lighting system employing a plurality of capsule-reflector modules arranged in a substantially linear horizontal array and having a maximum vertical height of only about two inches and a length greater than the array height. The disclosure of U.S. Pat. No. 4,569,002 is thus incorporated herein by reference. In addition to a significant reduction in size, the lighting system in accordance with the present invention is also capable of being positioned such that the front of the system approximately conforms to the contour of the motor vehicle, primarily for aerodynamic considerations. Furthermore, such a construction minimizes the collection of ice and snow during adverse weather conditions.

In order to contour a lighting system's headlamp to the frontal shape in many new automobile designs, it would be essential to orient the front portion of the headlamp at a relatively large angle (as much as sixty degrees) from vertical and/or at relatively large compound angles from a plane normal to the longitudinal center line of the vehicle. The front portion of existing headlamps is the portion wherein the principal lensing occurs so as to provide the specific light pattern required of the headlamp. Any tilting of this element from beyond about thirty degrees with respect to vertical, however, would cause several problems, resulting in poor light distribution. That is, the ability to provide the desired light distribution degenerates and ultimately such a system would become unusable as the front surface of the lens departs from the standard position of approximately perpendicular to the center line of the vehicle.

In one type of headlamp arrangement found on some foreign automobiles, a conventional headlamp is mounted in a recess in the automobile's surface. A relatively thin, clear plastic member is then located in front of the headlamp and serves as a continuation of the automobile front surface. This member, however, provides no lensing functions (which are done instead by the headlamp's own lens in the known manner). In addition, such an arrangement has been known to permit dirt build-up in the cavity between headlamp and plastic member because such members are not hermetically sealed to the automobile. As such, these arrangements fail to satisfy motor vehicle safety regulations in this country and are thus prohibited.

DISCLOSURE OF THE INVENTION

A primary object of the present invention is to provide an improved lighting system for use with a motor vehicle, and in particular an automobile, which is adapted in particular to improve the aerodynamic performance of the automobile.

Another object of the present invention is to provide a new lighting system which is characterized by an improved lens construction which enables both contouring thereof for aerodynamic purposes as well as proper orientation of the lensing surface(s) to assure proper optical lensing operation.

A further object of the present invention is to provide a motor vehicle lighting system having an improved lens member in which the member is integrally constructed and includes a lensing surface and a front (forward), contoured surface.

Still another object of the present invention is to provide a motor vehicle lighting system having an improved lens assembly in which the lens is in the form of an integral member having a front, contoured surface and a rear, lensing surface, said member being hollow and integrally sealed so as to prevent any dirt build-up between the contoured surface and the lensing surface.

In accordance with a primary aspect of the instant invention, there is provided a lighting system for a motor vehicle adapted to be mounted in a recess in a front, contoured surface of the vehicle. The system comprises a light source and reflector means mounted in the recess, and a lens assembly. The lens assembly comprises a hollow, enclosed, single-piece lens member having a front surface designed to coincide with the vehicle's front surface so as to enhance the aerodynamic performance of the vehicle. The lens member also has a rear lensing surface positioned substantially vertical as well as side and bottom surfaces for enclosing the member to provide a sealed dirt-free component. The lens member is mounted in the vehicle's recess forward of the light source and reflector means. The light source and reflector means may be a reflector-lamp module such as of the type described in the aforementioned copending application. Preferably, there are a plurality (e.g., four) of such reflector-lamp modules arranged in a linear horizontal array. The rear lensing surface of the lens member comprises a plurality of separate lens surfaces that correspond in number to the number of reflector-lamp modules employed in the array. These separate lens surfaces are, in one embodiment, arranged in different planes, said planes being disposed parallel to each other. The rear lensing surface of the lens member is, in the disclosed embodiment, directed inwardly (located internally) of the member. In an alternate embodiment, the light source and reflector means may comprise a paraboloid reflector which is secured directly to the lens member's rear surface on the outside thereof. This arrangement may utilize a replaceable lamp in association with the reflector.

BEST MODE FOR CARRYING OUT THE INVENTION

For a better understanding of the present invention, together with other and further objects, advantages and capabilities thereof, reference is made to the following disclosure and appended claims in connection with the above described drawings.

Figure 1:
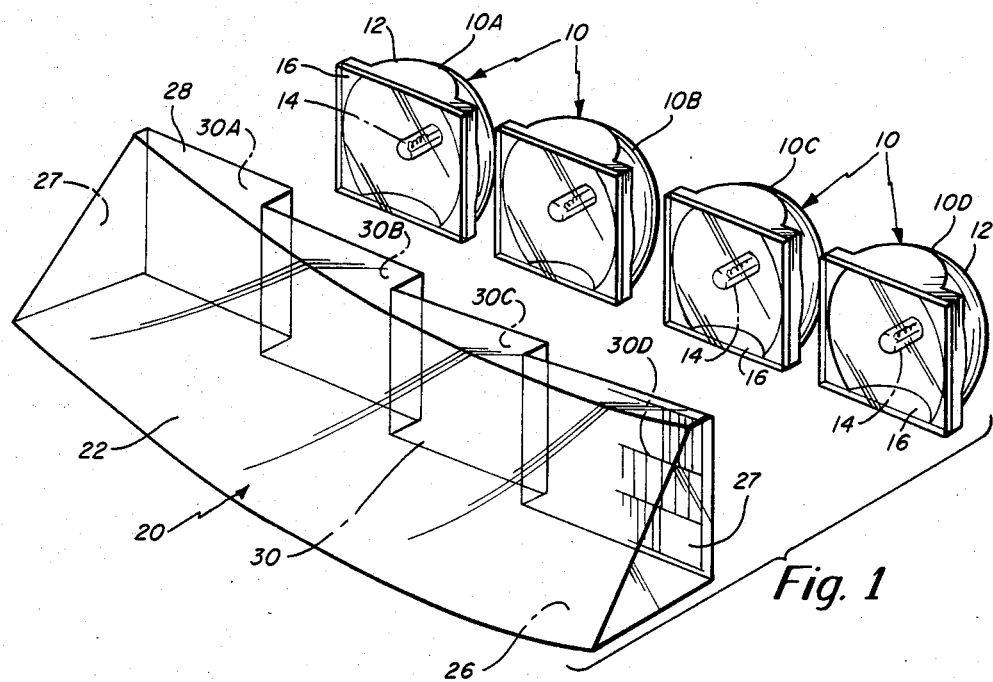
FIG. 1 is a perspective view illustrating the motor vehicle lighting system of the present invention showing the use of a plurality of lamp-reflector modules and a common lens member.
Figure 2:
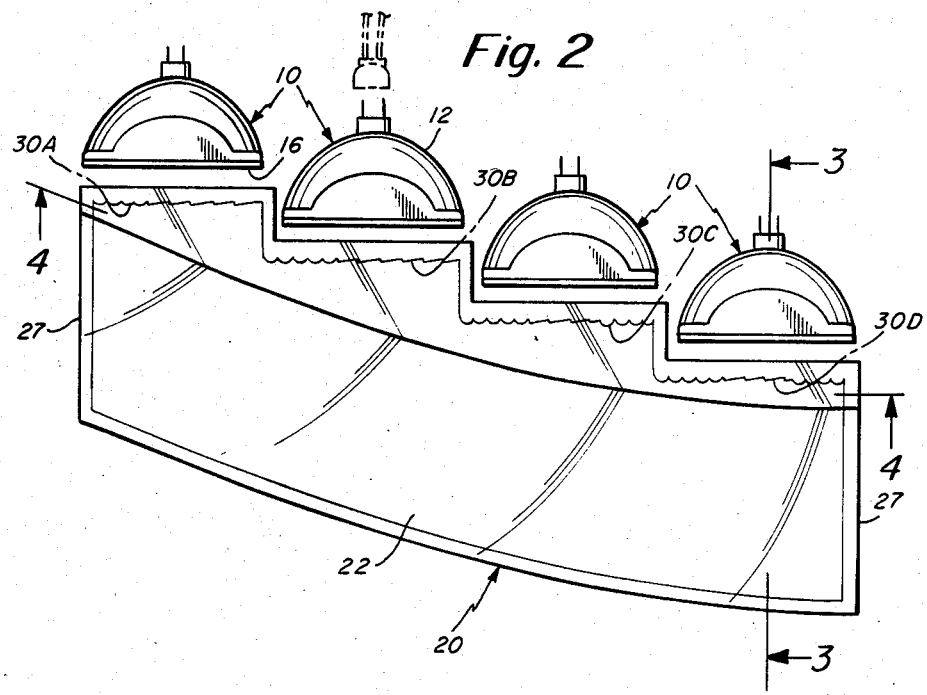
FIG. 2 is a plan view of the lighting system shown in FIG. 1, illustrating the placement of the lamp-reflector modules relative to the lens member.
Figure 3:
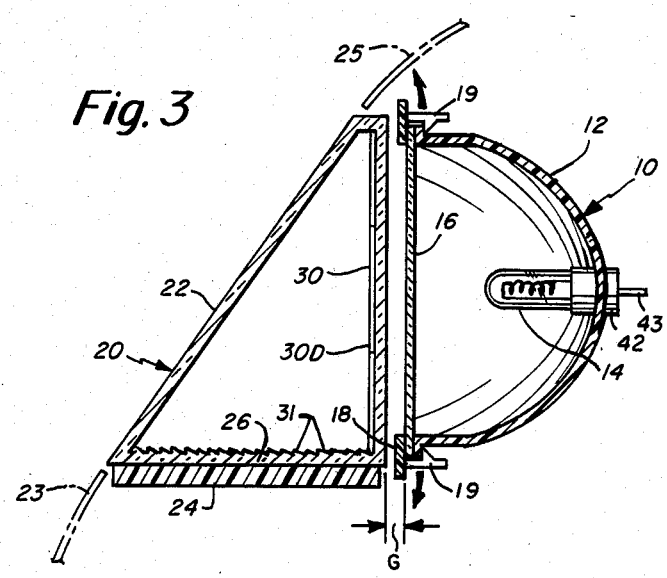
FIG. 3 is a cross-sectional view taken along line 3—3 of FIG. 2, illustrating one of the lamp-reflector modules and the associated lens member.

Referring now to the drawings, there is illustrated a motor vehicle lighting system in accordance with the principles of the present invention. The system, as explained below, is designed primarily for using a light and reflector combination in the form of an array of several (i.e., four) lamp-reflector modules 10. In FIG. 1, these modules are shown in an exploded perspective view with the modules thus being spaced slightly away from the lens member 20 of the invention. FIG. 2 also illustrates this array of lamp-reflector modules while FIG. 3 illustrates one of the modules in a cross-sectional view. Each of the modules 10 is hermetically sealed and comprises a parabolic reflector 12, a tungsten halogen, low wattage lamp capsule 14 mounted in the reflector, and a means for enclosing and sealing the front portion of the module, illustrated in FIG. 1 as an optically clear, planar cover 16. The cover 16 is of glass or plastic material, and is sealed along its entire perimeter to the reflector. This sealing may be provided by means of an appropriate adhesive. Reflector 12 is of plastic material. It is also noted that each of the reflectors 12 has slightly truncated top and bottom sections. By low wattage is meant from between about ten and twenty-five watts. The filament in the lamp of each module is of tungsten and is axially oriented along the optical axis of the reflector. Preferably, the filament is a single coiled (C8) element. All modules 10 are identical to facilitate subsequent replacement. A preferred plastic for the reflector and cover members is Lexan, a polycarbonate sold by the General Electric Company (owner of the trademark thereof).

With regard to FIG. 3, there is shown a means 18 (i.e., upper and lower brackets) for supporting the module 10. In this regard, the module 10 is preferably supported in an easily releasable mounting arrangement. That is, each bracket forms (or is attached to) part of the vehicle's structure. Both are spaced apart an established distance necessary to accommodate the module's front portion. Alternatively, a singular bracket can be employed having an aperture (or apertures, if several modules are to be housed simultaneously) therein, the module being located within the aperture and retained (i.e., using suitable clamps 19 which open in the direction indicated in FIG. 3) by the bracket. The module 10, for example, may then be withdrawn by lifting the hood of the vehicle and removing the module from its supporting bracket(s) and then replacing the module with a substantially identical one. With regard to the support for the lens member, this is simply illustrated in FIG. 3 by means of a support base 24 which is used for retaining the lens member 20 in a proper position. The lens member can simply rest on support 24, which in turn may form part of (or be attached to) the vehicle and be retained (i.e., by suitable clamping members, not shown) in an appropriate fashion. It may even be possible to seal (i.e., using an adhesive) the lens member on the support if a more permanent arrangement is desired.

It is noted in FIG. 3 that the mounting of the module relative to the lens member is such that there is some gap (G) therebetween. In accordance with one embodiment of the invention, there may be provided a reference surface molded on the rear of the lens member and against which the respective module would be positioned. In this way, for example, the module could be properly alignment relative to the lens at the desired spacing (gap). Significantly, alignment between the lens and the lamp-reflector module is superior (more precise) to that of a replaceable headlamp (with reflector) due to the relatively large reference base surface that could be provided. It is of course understood that the several modules 10 and adjacent lens member 20 must be aligned together (e.g., mechanically) to assure optimum light emission through the lens. In addition, it is also considered important to provide some means of adjusting both lens and modules for proper alignment (e.g. in the event of vehicle tilting). Such means could include a bubble level or the like as an integral part of lens member 20 to clearly indicate correct alignment (relative to vertical). Similar aligning means can be provided as an integral part of each capsule or as part of a common clamp-holder designed to accommodate all four modules in one assembly. Uniquely, alignment of all four can then be performed simultaneously, as can alignment of but a single lens member. Such a system should also include some means of indicating proper vehicle alignment to provide adequate comparison thereto prior to subsequent lens and/or module alignment.

With regard to the reflector-lamp modules 10, the main lighting source, as stated, is a low wattage, tungsten-halogen capsule 14, which is integrally mounted in precisioned alignment with reflector 12. As noted in FIG. 3, the module 10 is disposed relative to the lens so that there is the aforementioned gap (G) therebetween. The tungsten halogen capsule itself may be one known in the light art. Typically, this comprises a quartz glass envelope having a pinch (press) sealed end through which the filament's lead-in wires (e.g., nickel or molybdenum) pass. The filament, being of tungsten, is electrically connected within the capsule to each lead-in wire (or an extension thereof). The halogen cycle is known in the lighting art and further explanation is thus not deemed necessary. Examples of tungsten halogen lamps are shown in U.S. Pat. Nos. 4,126,810, 4,140,939, 4,262,229, and 4,296,351. The capsules of the instant invention, having only one filament therein, each include only two lead-in wires for being connected to the filament and for projecting externally of the envelope's press sealed end.

In accordance with the invention, there is provided a lens assembly 20 which is comprised of a hollow, enclosed, single piece lens member having a clear front surface 22 positioned to coincide with the vehicle's front surface so as to enhance aerodynamic performance of the motor vehicle as well as the system itself. In this regard, particular attention is drawn to the front surface 22 in FIG. 3 and the manner in which it matches (conforms to) the contour of the adjacent automobile frontal surfaces 23 and 25. Additionally, the lens member 20 comprises a bottom wall 26, opposed side walls 27, top wall 28, and a rear lensing wall 30. It is preferred that substantially all of the lensing function occur at this rear wall 30, which, as shown in FIGS. 1 and 2, is actually separated into four individual lensing regions identified in FIG. 1 as walls 30A, 30B, 30C, and 30D. These four walls respectively correspond to (align with) the individual lamp-reflector modules identified in FIG. 1 as modules 10A, 10B, 10C, and 10D, respectively. Specifically, each of the back walls 30 includes on the internal surface thereof selected lensing elements designed to direct (control) the forward light emitted by the respective module located adjacent thereto. Locating these elements internally in a closed member prevents the possible accumulation of dirt or other matter thereon which could adversely affect the lensing capability of member 20. The front contoured surface 22 is of clear plastic (the entire lens member is preferably also constructed of plastic, i.e., Lexan). The contoured front plastic cover is joined to the lensing walls and thus forms the described sealed member that prevents dirt and moisture from building up in the intervening space between the contoured front and rear portions thereof. Accordingly, the front surface does not provide a lensing function. Although the rear wall 30 of lens member 20 is shown in the drawings as being parallel to the front, clear cover 16 of the adjacent module, it is possible to orient this wall at an angle of up to about thirty degrees from cover 16, the larger spacing being at the lower portion of gap G. It is also possible to orient the clear, non-lensing front wall (surface) 22 at an angle of from about thirty to about fifty degrees relative to the vertically positioned cover 16. Further, it is considered important to provide some means of preventing forward light from reflecting from the internal surface of bottom wall 26. This is preferably achieved by providing a series of lateral grooves 31 (FIG. 3) in this internal (upper) surface, said grooves preferably occupying a sawtooth pattern. Alternatively, an opaque coating (i.e., black paint) can be provided on this surface, or still further, the wall can be tilted (oriented) downwardly in a forward direction so as to slope away at an obtuse angle from the vertical cover 16.

Figure 4:
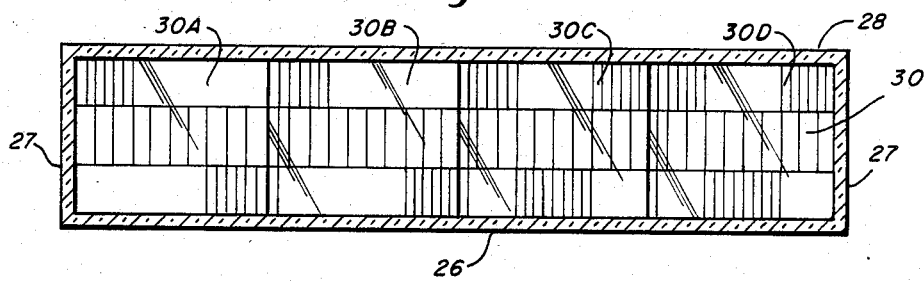
FIG. 4 is a front elevational view in section, as taken along line 4—4 of FIG. 2, illustrating the rear, inner lensing surface of the lens member.

FIG. 4 is a cross-sectional view taken along line 4-4 of FIG. 1, showing the lensing walls which are identified in FIG. 1 as surfaces 30A, 30B, 30C and 30D but not fully illustrated in FIG. 1 for clarification purposes. It is noted that the lensing side of the surface is directed inwardly, as stated, such that the lens, being a sealed unit, prevents dirt accumulation or the like on the lensing surface itself.

Although the disclosed embodiment incorporates at least one, and preferably several separate (e.g., four) modules 10 in combination with the lens member, in an alternate embodiment of the invention, a reflector member having a lamp capsule therein can be bonded directly to the flat rear surface of the lens. This can be used in an arrangement, for example, in which the light source or light capsule is replaceable through the rear of the reflector. In this instance, the individual lamp capsule is of the replaceable type and can include a suitable insulative base in which the capsule's lead-in wires are securely positioned. The reflector's rear wall could include a suitable opening and corresponding internal grooving or the like designed to accommodate male pins or the like on the base being positioned (i.e., rotatively) therein. As shown, in FIG. 3, the capsule is located within an insulative base member 42 which in turn is securely positioned within an aperture located in the rear of reflector 12. Conductors (43) extending from the base can be suitably connected to the power source associated with the motor vehicle using the invention.

One of the advantages of the construction of the present invention is that only one substantially universal lens assembly need be designed, tooled and fabricated. For each different vehicle type, with a different frontal contour, a clear cover (surface wall 22) with the necessary enclosing side walls may be formed. These can then be bonded to such a universal lens wall to form a sealed module for the vehicle. In this way, a single lensing wall (identified in FIG. 1 as number 30) may be used with a number of different front sections depending upon the frontal contour of the vehicle in which it is to be used.

Reference has been made previously to the reflectors 12 of each module as including slightly truncated top and bottom segments. In an alternate arrangement, it is possible to use non-truncated reflectors. Also, the number of modules that are employed is dependent upon the vehicle's optical requirements. It is thus readily possible to increase the number of modules to include such auxiliary functions as turn signals, auxiliary driving lights, fog lamps, etc. In addition, it is clear from the foregoing that the preferred module-lens arrangement in the standard automobile will comprise a pair of such lens members 20 spacedly positioned (e.g., within the fenders or grillwork) of the respective automobile, with a plurality (e.g., four) modules 10 for each lens. A total of at least eight modules will thus be employed per vehicle (four per side). Should auxiliary lights be also desired, these of course will add to this total (eight). It is also within the scope of this invention to provide but a singular lens member having all eight modules aligned therewith (thus incorporating a total of at least eight rear lens walls), but such an arrangement would require some form of central spacing of the two groups of modules to comply with existing motor vehicle regulations (spaced-apart headlighting).

It is also understood that four modules per lens member provides sufficient illumination that less than all (e.g., two) may be utilized to provide the necessary low beam requirements for one side of the vehicle while the activation of all four will serve to provide high beam illumination. The preferred low beam modules are those located nearest the outer side portion of the vehicle. In FIGS. 1 and 2, these are the two located to the left.

While there have been shown and described what are at present considered the preferred embodiments of the invention, it will be obvious to those skilled in the art that various changes and modifications may be made therein without departing from the scope of the invention as defined by the appended claims.

What is claimed is:

1. A lighting system for providing forward illumination for a motor vehicle and adapted to be mounted in a recess or the like within a front, contoured surface of said motor vehicle, said system comprising:

at least one hermetically sealed lighting module including a reflector, a lamp capsule mounted within said reflector, and an optically clear cover sealed to said reflector;

a lens assembly comprising a hollow, enclosed single piece lens member having a front, clear surface positioned to coincide with said front contoured surface of said vehicle so as to enhance the aerodynamic performance of said lighting system, a rear lensing portion positioned in a substantially vertical orientation non-parallel to and spaced from said front surface, and side walls for enclosing said member fo provide a sealed, dirt-free member, substantially all of a light modifying lensing function of said lens assembly being provided solely by said rear lensing portion; and means for mounting said lens member so as to be spaced in front of said lighting module is said recess forward of said lighting module such that the light emitted by said module will pass through said lens member.

2. The lighting system as defined in claim 1 wherein said rear lensing portion includes a plurality of lensing elements located on an internal surface of said rear lensing portion.

3. The lighting system as defined in claim 1 wherein said rear lensing portion of said lens member includes a plurality of lensing elements located within an internal surface of said rear lensing portion.

4. The lighting system as defined in claim 1 wherein said lighting module reflector includes a substantially parabolic reflecting surface, said reflector secured to said rear lensing portion of said lens member on the outside thereof.

5. The lighting system as defined in claim 4 wherein said lamp is replaceable within said reflector.

6. The lighting system as defined in claim 1 wherein said lens member has a bottom wall also enclosing said member.

7. The lighting system as defined in claim 6 wherein said bottom wall includes an internal surface having thereon means for preventing reflection of said light emitted by said light source.

8. The lighting system as defined in claim 7 wherein said means for preventing reflection comprises a plurality of grooves formed within said surface.

9. The lighting system as defined in claim 7 wherein said means for preventing reflecting comprises an opaque coating on said internal surface.

10. The lighting system defined in claim 1 including a plurality of said hermetically sealed lighting modules, said modules being disposed in a linear and horizontal manner.

11. The lighting system as defined in claim 10 wherein the number of said modules is four.

12. The lighting system as defined in claim 11 wherein said rear lensing portion of said lens member comprises a rear lensing surface including a plurality of separate lens surfaces, each of said surfaces aligning with a respective one of said lighting modules.

13. The lighting system as defined in claim 12 wherein all of said lens surfaces are disposed in different planes, said planes being substantially parallel to each other.

* * * * *